United States Patent
Ono

(10) Patent No.: US 6,653,806 B1
(45) Date of Patent: Nov. 25, 2003

(54) DYNAMIC BRAKE CIRCUIT AND SEMICONDUCTOR INVERTER USING DYNAMIC BRAKE CIRCUIT

(75) Inventor: Akihisa Ono, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 09/926,171
(22) PCT Filed: Mar. 13, 2000
(86) PCT No.: PCT/JP00/01512
§ 371 (c)(1),
(2), (4) Date: Dec. 26, 2001
(87) PCT Pub. No.: WO00/55963
PCT Pub. Date: Sep. 21, 2000

(30) Foreign Application Priority Data

Mar. 18, 1999 (JP) .............................................. 11-074159

(51) Int. Cl.⁷ ................................................. H02P 3/12
(52) U.S. Cl. ....................... 318/375; 318/376; 318/378; 318/781; 318/787
(58) Field of Search ................................. 318/375, 378, 318/376, 781, 787

(56) References Cited

U.S. PATENT DOCUMENTS 4,651,077 A * 3/1987 Woyski ........................ 318/781
5,436,540 A * 7/1995 Kumar ......................... 318/375

FOREIGN PATENT DOCUMENTS

JP 01-209973 8/1989
JP 08-251961 9/1996

* cited by examiner

Primary Examiner—Karen Masih
(74) Attorney, Agent, or Firm—Armstrong, Westerman & Hattori, LLP

(57) ABSTRACT

The invention prevents the voltage change dv/dt occurring at an inverter from directly igniting a semiconductor braking switch and short-circuiting the inverter during operation.

In a dynamic brake circuit which absorbs energy by brake resistor 15 upon igniting semiconductor braking switch 14 and short-circuiting power supply lines of the motor 10 when braking motor 10, which is driven by an inverter part comprised of three-phase AC power supply 1, three-phase bridge rectifier circuit 3, smoothing capacitor 6, and semiconductor switching devices 7, high resistor 20 is disposed between the anode side of the smoothing capacitor 6 and the anode side of the semiconductor braking switch 14, whereby snubber capacitor 17 of snubber circuit 18 connected in parallel to the semiconductor braking switch 14 is charged via this high resistor 20 prior to operation of the inverter part.

5 Claims, 5 Drawing Sheets

DYNAMIC BRAKE CIRCUIT AND SEMICONDUCTOR INVERTER USING DYNAMIC BRAKE CIRCUIT

TECHNICAL FIELD

The present invention relates to prevention of erroneous operations of a dynamic brake circuit of a motor to be driven by an inverter comprised of semiconductor switching devices.

BACKGROUND ART

To stop inverter drive motors, which are represented by permanent magnet synchronous motors, in a case of emergency, a method called "dynamic brake" has been employed in which the operation of the inverter is stopped, power generated from the power supply lines of the motor that rotates under inertia is short-circuited with a brake resistor and consumed as heat energy, and the energy is absorbed for braking.

FIG. 5 is a circuit diagram of a conventional brake for an inverter drive motor.

In this figure, to anode 26 at the output of the bridge circuit having six diodes 25 connected to a three-phase AC power supply, one end of smoothing resistor 27 is connected, and smoothing capacitor 29 is connected between the other end of this smoothing resistor 27 and cathode 28 at the output of the bridge circuit. In parallel with this smoothing capacitor 29, three pairs of semiconductor switching devices 30 such as transistors and thyristors, each two of which are connected together in series, are connected. The intermediate connecting points of these semiconductor switching devices 30 are connected to the power supply lines 32 of the motor 31, and the motor is driven at a phase corresponding to the switching timing of the semiconductor switching devices 30.

On the other hand, to brake this motor 31, a series circuit is provided, which consists of a three-phase bridge rectifier circuit including diodes 33 connected to the power supply lines 32, thyristor 34 as a semiconductor braking switch, and brake resistor 35. A snubber circuit in which snubber resistor 36 and snubber capacitor 37 are connected in series is connected to this thyristor 34 in parallel. In the figure, ignition current limiting resistor 38, photocoupler 39 consisting of a photodiode and a photothyristor, bias capacitor 40, and bias resistor 41 comprise an ignition control circuit of the thyristor 34.

In such a conventional inverter, in order to cause the motor 31 to make an emergency stop, for example, when continuity of the semiconductor switching devices 30 is interrupted to stop power supply to the motor 31, and the photodiode of the photocoupler 39 is caused to emit light and the photothyristor is caused to electric-insulatingly ignite, a signal is applied to the gate of the thyristor 34, so that the thyristor 34 ignites and makes continuity. Thereby, electricity that has been generated from the motor 31 and sent to the power supply lines 32 flows to the diodes 33, thyristor 34, brake resistor 35, diodes 33, and power supply lines 32, and then heat is generated and absorbed by the brake resistor 35. Thereby, the motor 31 is rapidly braked.

However, in a conventional inverter, in the switching operations of the semiconductor switching devices 30 when operating the inverter, if the rate of voltage change dv/dt is excessively great, the critical OFF voltage rise rate of the thyristor is exceeded, the photothyristor and thyristor 34 of the photocoupler 39 are caused to erroneously ignite, and the inverter outputs, that is, the power supply lines 32 are short-circuited although there is no request for braking.

In order to prevent this problem, the capacitance of the snubber circuit must be made sufficient to suppress the rate of voltage change dv/dt, or a semiconductor braking switch with a sufficiently great critical OFF voltage rise rate must be selected. Therefore, the circuit becomes large and complicated, and cost for the parts increases.

Therefore, the object of the invention is to provide a safe brake for an inverter drive motor in which the rate of voltage change dv/dt generated by the operation of the semiconductor switching devices of the inverter is not directly applied to the semiconductor braking switch.

DISCLOSURE OF INVENTION

In order to achieve the abovementioned object, according to the first aspect of the invention, a dynamic brake circuit, which comprises a series circuit including resistors for converting loaded electric energy into heat and semiconductor switching devices, which are connected in series, and a snubber circuit including a capacitor connected in parallel to the semiconductor switching devices, further comprises a charging circuit for charging electricity in the capacitor prior to driving to load.

Furthermore, according to the second aspect of the invention, in a semi conductor inverter, which comprises a first rectifier for rectifying alternating currents, a smoother for smoothing the output of the first rectifier, and an inverter part for switching the output from the smoother at a desired timing by the first semiconductor switching device, and further comprises a dynamic brake circuit consisting of a second rectifier for rectifying the output from the inverter part and a series circuit including the first resistance and second semiconductor switching device that are connected between the output terminals of the second rectifier, and a snubber circuit including a capacitor connected in parallel to the second semiconductor switching device, the inverter is provided with a charging circuit for charging electricity in the capacitor before the inverter starts an inverter operation.

Furthermore, according to the third aspect of the invention, the charging circuit is comprised of a second resistance connected between the anode side of the smoother and anode side of the dynamic brake circuit, and a third switching device.

Moreover, according to the fourth aspect of the invention, in place of the third switching device, a part of the first semiconductor switching devices is commonly used.

According to the fifth aspect of the invention, in the inverter according to the second aspect of the invention, which has flywheel diodes connected in antiparallel to the first semiconductor switching device, the flywheel diodes are commonly used in place of the diodes comprising one arm of the second rectifier.

BEST MODE FOR CARRYING OUT THE INVENTION

Next, an embodiment of the invention is explained in detail with reference to FIG. 1 through FIG. 4.

FIG. 1 through FIG. 4 are circuit diagrams showing an example in which a charging circuit for charging snubber capacitor 17 of snubber circuit 18.

Figure 1:
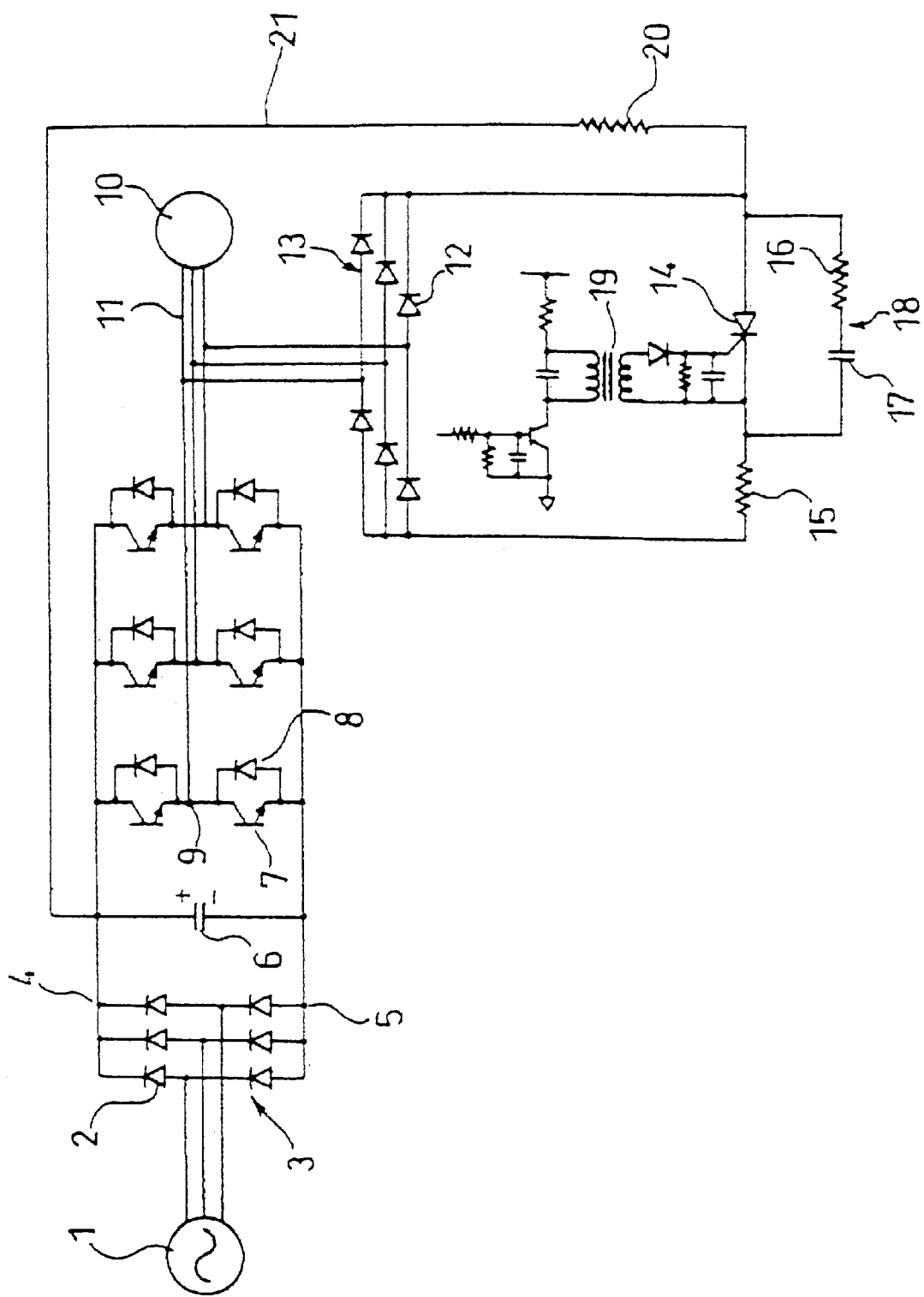
FIG. 1 is a circuit diagram showing an embodiment of a semiconductor inverter with a dynamic brake circuit according to the invention.

In FIG. 1, the anode and cathode of smoothing capacitor 6 are connected to anode 4 and cathode 5 at the output of bridge circuit 3 in which six diodes 2 are connected to three-phase AC power supply 1. Three pairs of semiconductor switching devices 7 such as thyristors, transistors or the like, each two of which are connected in series, are connected in parallel to the smoothing capacitor 6 to form an inverter part. Flywheel diodes 8 are connected in antiparallel to the semiconductor switching devices 7, and the intermediate connecting points 9 of the semiconductor switching devices 7 are formed as output points of each phase, and to these points, power supply lines 11 of each phase of motor 10 are connected. The phase of the motor 10 is controlled with characteristics corresponding to the switching timings of the semiconductor switching devices 7.

In order to brake this motor 10, a dynamic brake circuit is provided in which three-phase bridge circuit 13 including diodes 12 connected to the power supply lines 11, thyristor 14 as a semiconductor braking switch, and brake resistor 15 are connected in series.

Furthermore, snubber circuit 18 including snubber resistor 16 and snubber capacitor 17 connected in series is connected in parallel to the thyristor 14. To the gate electrode of the thyristor 14, an ignition circuit using a pulse transformer is connected.

Charging circuit 21 comprised of charging resistor 20 with a high ohmic value is connected between the anode side of the thyristor 14 and the anode side of the smoothing capacitor 6. In the abovementioned circuitry, when the snubber capacitor 17 is charged prior to driving the inverter part, any of the semiconductor switching devices 7 of the negative side arm of the inverter part maybe ignited. Then, a closed charging circuit is formed from the anode of the smoothing capacitor 6, charging resistor 20 of the charging circuit 21, snubber resistor 16 of the snubber circuit 18, snubber capacitor 17, brake resistor 15, the negative side arm diode of the three-phase bridge circuit 13, power supply lines 11, semiconductor switching devices 7 to the cathode of the smoothing capacitor 6, and charges in the smoothing capacitor 6 are charged in the snubber capacitor 17.

The voltage at both ends of the snubber capacitor 17, that is, the voltage at both ends of the thyristor 14 after charging is finished becomes equal to the voltage of the smoothing capacitor 6.

The charging time constant τ (t) in this case is expressed by the following equation (1).

$$\tau(t)=(R15+R16+R20)\times C17 \tag{1}$$

Thus, according to the invention, the snubber capacitor 17 is charged in the condition where an extreme rate of voltage change dv/dt is suppressed by the charging resistor 20 with a high ohmic value and the time constant of the snubber capacitor 17, and even if the inverter operation is started after the snubber capacitor 17 is charged, since the same voltage as that of the smoothing capacitor 6 as an input of the inverter part has already been charged in the snubber capacitor 17, dv/dt due to switching of the transistors comprising the inverter part is not applied at all to the thyristor 14 that functions as a switch of the dynamic brake circuit, and therefore, erroneous ignition of the thyristor 14 is prevented.

In addition, it becomes unnecessary to make the thyristor 14 for prevention of erroneous ignition sufficiently resistant against dv/dt, and also, the snubber circuit 18 can be simplified to be small in capacitance.

As switching devices for the dynamic brake circuit, thyristors are used in this embodiment, however, they are not limited to thyristors, but may be mechanical switches (for example, relays) as well as triacs, transistors, or the like. As a method for driving these semiconductor switching devices, currents are flown into a pulse transformer or relay coil as well as a photocoupler.

The resistors provided in the charging circuit may be disposed at any locations within the circuit, and if the charging period of time is adjustable by control of the current by means of the charging means, the resistors are not necessary.

In addition, in the embodiment of the invention, the transistor (first semiconductor switching devices) of the inverter part is commonly used as a charging circuit opening and closing switch, however, as a matter of course, a third switching device exclusively for opening and closing the charging circuit may be externally and separately provided.

Figure 2:
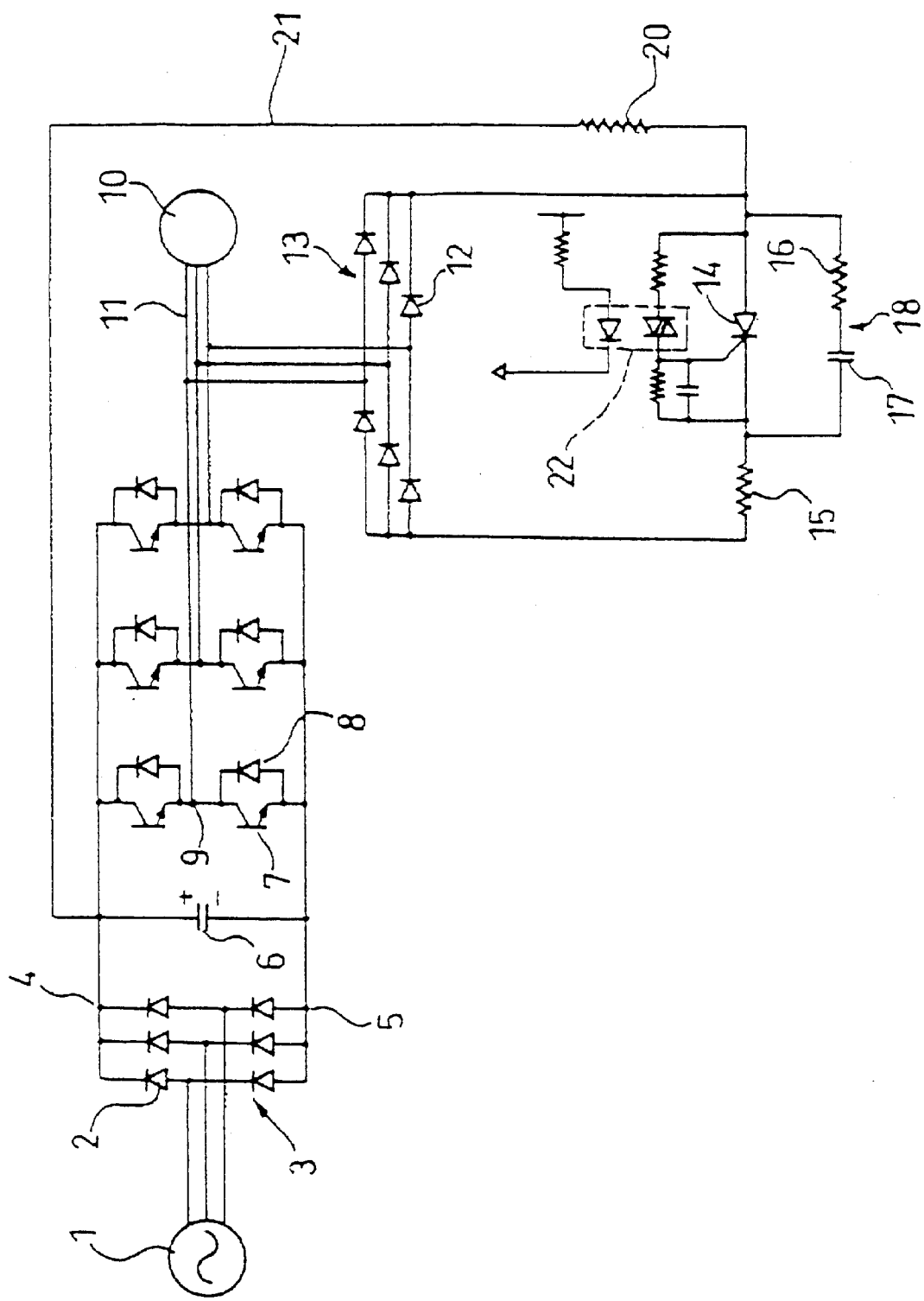
FIG. 2 is a drawing showing a semiconductor inverter having a thyristor ignition circuit that is different from FIG. 1.

FIG. 2 shows an example of a case where the ignition circuit of the example shown in FIG. 1 is changed.

In FIG. 2, the anode and cathode of the smoothing capacitor 6 are connected to the anode 4 and cathode 5 at the outputs of the bridge circuit in which six diodes 2 are connected to the three-phase AC power supply 1. Three pairs of semiconductor switching devices 7, each two of which are connected in series, are connected in parallel to the smoothing capacitor 6 to form an inverter part. Flywheel diodes 8 are connected to the semiconductor switching devices 7, respectively, and the intermediate connecting points 9 of the semiconductor switching devices 7 are formed as output points of each phase, and to the points, the power supply lines 11 of each phase of the motor 10 are connected. The phase of the motor 10 is controlled by characteristics corresponding to the switching timings of the semiconductor switching devices 7.

In order to brake this motor 10, a dynamic brake circuit is provided, in which three-phase bridge circuit 13 having diodes 12 connected to the power supply lines 11, thyristor 14, and brake resistor 15 are connected in series. Snubber circuit 18, in which snubber resistor 16 and snubber capacitor 17 are connected in series, is connected in parallel to the thyristor 14. An ignition circuit using photocoupler 22 consisting of a pair of phototransistor and photothyristor is connected to the gate electrode of the thyristor 14. They photocoupler 22 is employed for electric insulation upon replacing the signals at the ignition power supply side with a low voltage and at the thyristor side with a high voltage by light.

Charging circuit 21 comprised of charging resistor 20 with a high ohmic value relating to the invention is connected between the anode side of the thyristor 14 and the anode side of the smoothing capacitor 6. Thereby, the snubber capacitor 17 is always charged in advance of operation of the inverter part.

In the abovementioned circuitry, in the case where the snubber capacitor 17 is charged prior to operation of the inverter part, any of the semiconductor switching devices 7 of the negative side arm of the inverter part may be ignited.

Then, a closed charging circuit is formed from the anode of the smoothing capacitor 6, charging resistor 20 of the charging circuit 21, snubber resistor 16 of the snubber circuit 18, snubber capacitor 17, brake resistor 15, negative side arm diode of the three-phase bridge circuit 13, power supply lines 11, and semiconductor switching devices 7 to the cathode of the smoothing capacitor 6, whereby charges in the smoothing capacitor 6 are charged in the snubber capacitor 17.

The voltage at both ends of the snubber capacitor 17, that is, the voltage at both ends of the thyristor 14 after charging is finished becomes equal to the voltage of the smoothing capacitor 6.

According to the invention thus composed, the snubber capacitor 17 is charged in a condition where an extreme rate of voltage change dv/dt is suppressed by the charging resistor 20 with a high ohmic value and the time constant of the snubber capacitor 17, and even when the inverter operation is started after the snubber capacitor 17 is charged, since the same voltage as that of the smoothing capacitor 6 as the input of the inverter part has already been charged in the snubber capacitor 17, dv/dt due to switching of the transistors comprising the inverter part is not applied at all to the thyristor 14, which functions as a switch for the dynamic brake circuit, and the photothyristor 22 at all. Therefore, erroneous ignition of the thyristor 14 and photothyristor 22 is prevented. In addition, it becomes unnecessary to make the thyristor 14 for prevention of erroneous ignition and photothyristor 22 sufficiently resistant against dv/dt, and also, the snubber circuit 18 can be simplified to be small in capacitance.

Figure 3:
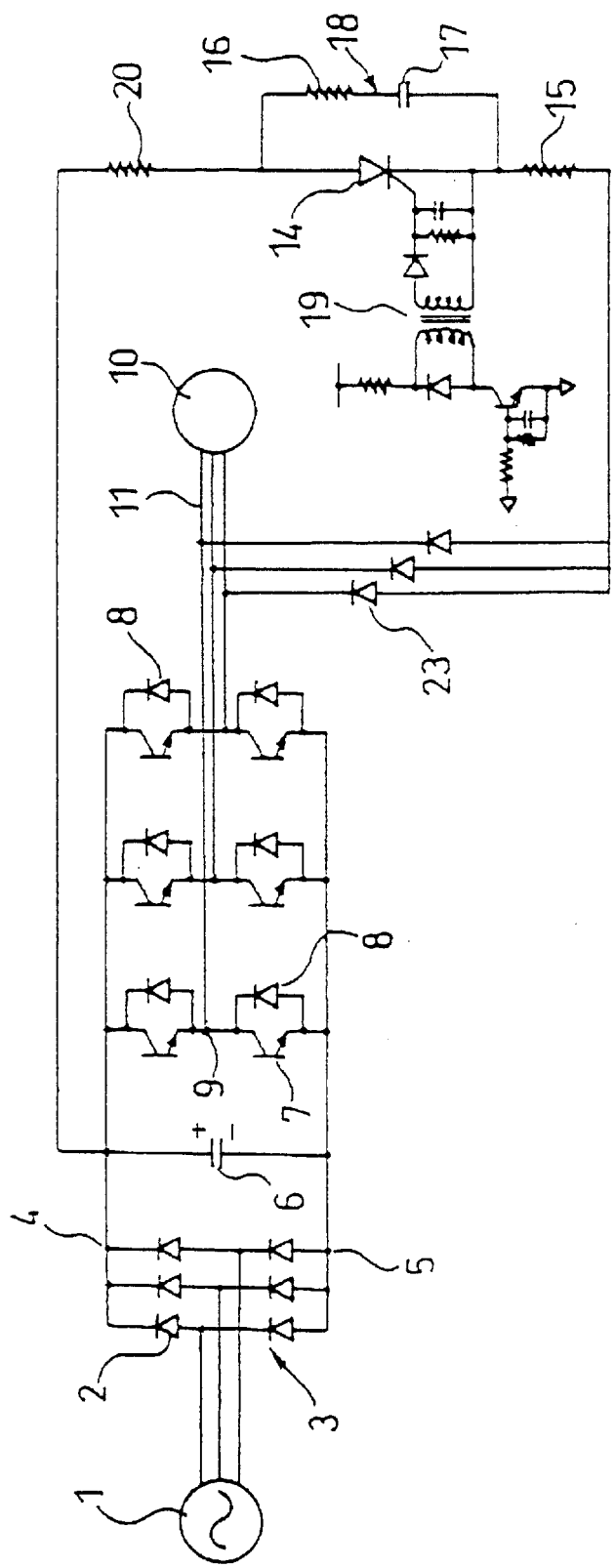
FIG. 3 is a circuit diagram showing a modified example of FIG. 1.

FIG. 3 shows a circuit constructed so that devices of the generation brake circuit and devices of the energy absorbing circuit of the motor power supply lines are commonly used.

In FIG. 3, the anode and cathode of the smoothing capacitor 6 are connected to the anode 4 and cathode 5 at the output of the bridge circuit 3 in which six diodes 2 are connected to the three-phase AC power supply 1, three pairs of semiconductor switching devices 7 such as transistors, each two of which are connected in series, are connected in parallel to the smoothing capacitor 6 to form an inverter part, flywheel diodes 8 are connected in antiparallel to the semiconductor switching devices 7, the intermediate connecting points 9 of the semiconductor switching devices 7 are formed as output points of each phase, and the points to which power supply lines 11 of each phase of the motor 10 are connected are the same in the case of FIG. 1 and FIG. 2.

In this example, charging resistor 20 one end of which is connected to the anode side of the smoothing capacitor 6, thyristor 14 anode side of which is connected to the other end of the charging resistor 20, brake resistor 15 one end of which is connected to the cathode side of the thyristor 14, and three diodes 23, anode sides of which are connected to the other end of the brake resistor 15 and cathode sides of which are connected to the power supply lines 11 of each phase of the motor, are provided, and an ignition circuit using pulse transformer 19 is connected to the gate electrode of the thyristor 14.

In this circuit, in a case where it is necessary to brake the motor 10, when the ignition circuit of the thyristor 14 is turned ON after ignition of the semiconductor switching devices 7 of the inverter part is canceled and the inverter operation is suspended, thyristor 14 conducts electricity. Therefore, a circuit is formed from the power supply lines 11, intermediate connecting points 9, flywheel diodes 8, charging resistor 20, thyristor 14, brake resistor 15, and diodes 23 to the power supply lines 11, and the brake resistor 15 generates heat and absorbs energy, whereby the motor 10 is braked.

Thus, according to the present embodiment, the diode group 12 of the anode side arm of the second rectifier 13 of FIG. 1 is replaced with the flywheel diodes 8 of the first semiconductor switching devices 7 of the anode side arm, and this contributes to reduction in size and cost.

Also, in this circuit, as described above, the snubber capacitor 17 is always charged via the charging resistor 20 to suppress dv/dt of the inverter part, and the diodes 23 prevent direct entrance of dv/dt from the inverter part, so that short-circuiting failures due to the dynamic brake circuit do not occur during the inverter operation.

Figure 4:
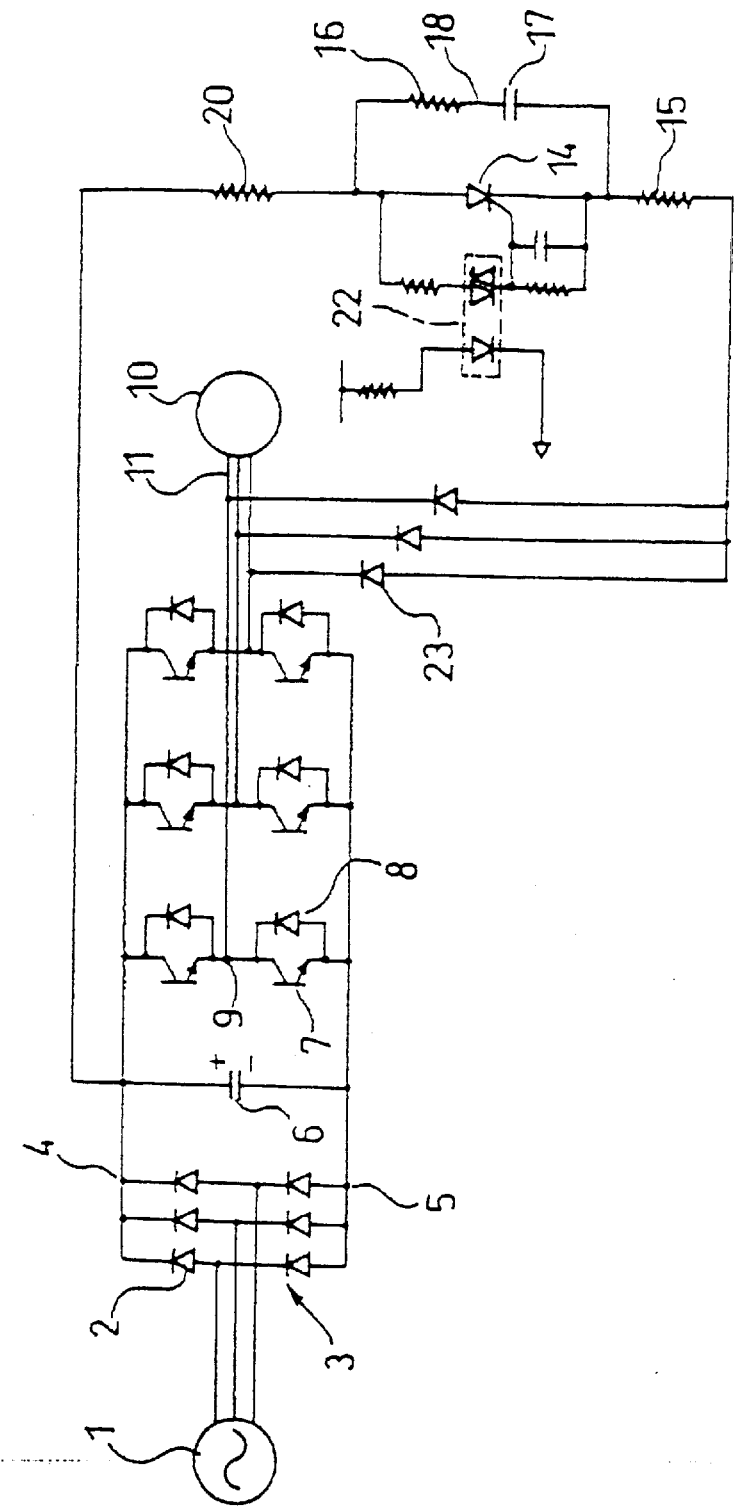
FIG. 4 is a circuit diagram showing a modified example of FIG. 2.
Figure 5:
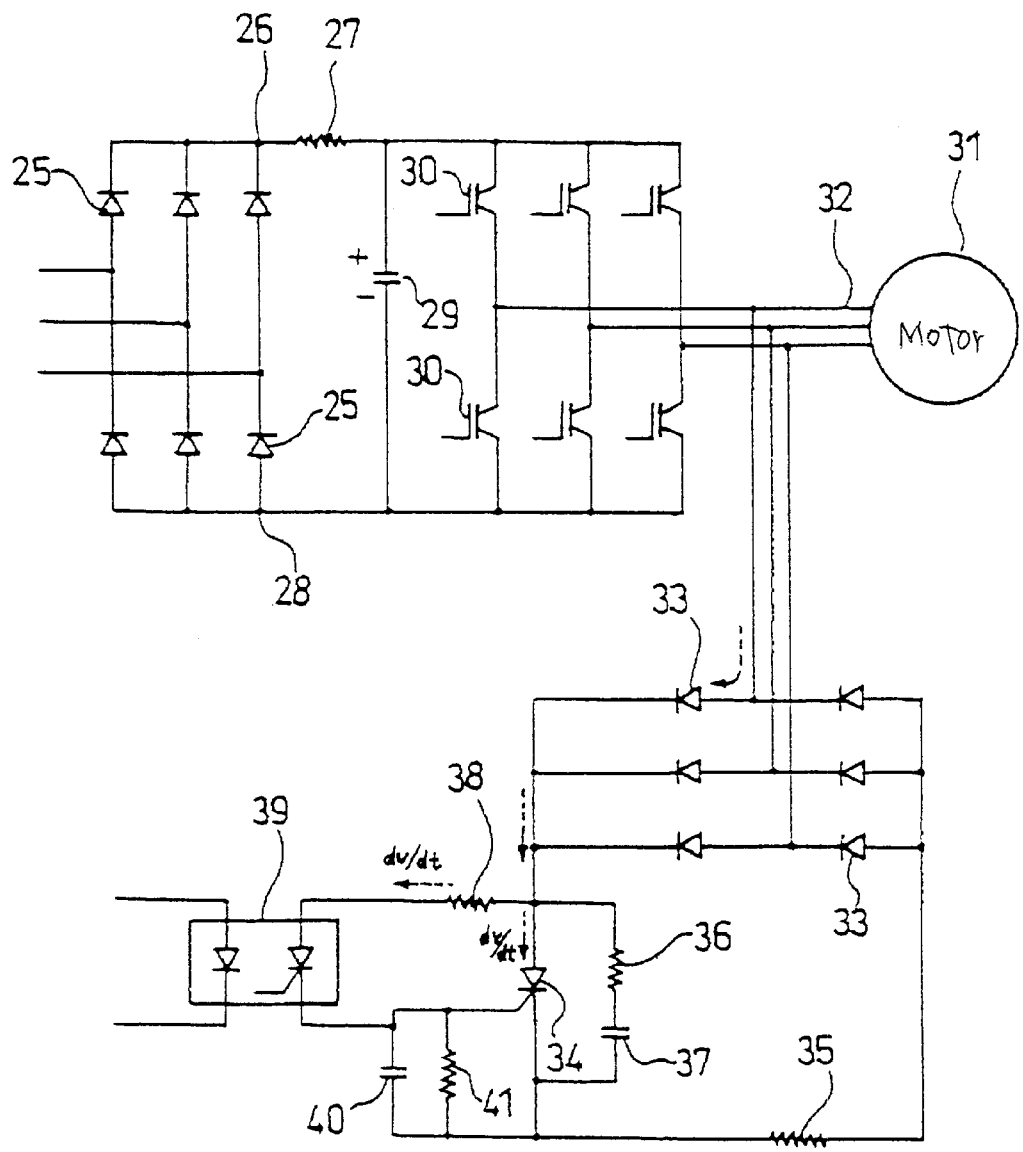
FIG. 5 is a circuit diagram of a conventional inverter.

FIG. 4 shows an example in which photocoupler 22 comprised of a photodiode and a photothyristor is used for the ignition circuit of the thyristor 14 of the circuit of FIG. 3 in place of the circuit using the pulse transformer 19, wherein other points in construction are the same, so that explanation for the points is omitted by attaching the same symbols as those of FIG. 3 to the same points.

As described above, according to the invention, in a brake constructed so that, when braking an inverter drive motor, which is driven by switching outputs of a current obtained through rectification of an alternating current and smoothing by a smoothing capacitor, a semiconductor braking switch is ignited, the power supply lines of the motor are short-circuited, and energy is absorbed by a brake resistor, a charging circuit for always charging a snubber capacitor is provided between the anode side of the smoothing capacitor and the anode side of the semiconductor braking switch, whereby the voltage change dv/dt of the inverter part is not applied to the semiconductor braking switch, so that erroneous operations of the semiconductor braking switch can be prevented.

Therefore, the snubber circuit can be simplified, and a part with low resistance against dv/dt can be used, so that the price of the circuit can be reduced.

Industrial Applicability

The invention provides a simplified dynamic brake circuit with high reliability at a low price, which can be used for purposes that cause motors to make urgent, acceleration and deceleration and emergency stops by using inverters.

What is claimed is:

1. A dynamic brake circuit comprising:
   a circuit consisting of resistors for converting loaded electric energy into heat and semiconductor switching devices connected in series, and
   a snubber circuit including a capacitor connected in parallel to the semiconductor switching devices, wherein
   a charging circuit for charging the capacitor prior to drive of the load is provided.

2. A semiconductor inverter comprising a first rectifier for rectifying alternating currents, a smoother for smoothing the output of the first rectifier, an inverter part for switching the output of the smoother by first semiconductor switching devices at desired timings, and further comprising a dynamic brake circuit, which consists of a second rectifier for rectifying the output of the inverter part and a series circuit including a first resistor connected between the output terminals of the second rectifier and a second semiconductor switching device, and a snubber circuit including a capacitor connected in parallel to the second semiconductor switching device, wherein
   a charging circuit for charging the capacitor before the inverter part starts inverter operation is provided.

3. A semiconductor inverter according to claim 2, wherein the charging circuit is comprised of a second resistor and a third switching device that are connected between the anode side of the smoother and the anode side of the dynamic brake circuit.

4. A semiconductor inverter according to claim 3, wherein a part of the first semiconductor switching devices is used in place of the third switching device.

5. A semiconductor inverter according to claim 2 comprising flywheel diodes connected in antiparallel to the first semiconductor switching devices, wherein in place of diodes comprising one arm of the second rectifier, the flywheel diodes are used.

* * * * *